United States Patent
Vaidyanathan et al.

(10) Patent No.: US 7,653,552 B2
(45) Date of Patent: Jan. 26, 2010

(54) DIGITAL FILE MARKETPLACE

(75) Inventors: Vijay Vaidyanathan, Los Altos Hills, CA (US); Christopher Allin Kitze, Incline Village, NV (US)

(73) Assignee: Qurio Holdings, Inc., Raleigh, NC (US)

( * ) Notice: Subject to any disclaimer, the term of this patent is extended or adjusted under 35 U.S.C. 154(b) by 1564 days.

(21) Appl. No.: 10/032,751

(22) Filed: Oct. 27, 2001

(65) Prior Publication Data

US 2002/0138291 A1 Sep. 26, 2002

Related U.S. Application Data

(63) Continuation-in-part of application No. 09/963,812, filed on Sep. 26, 2001.

(60) Provisional application No. 60/277,787, filed on Mar. 21, 2001.

(51) Int. Cl.
*G06Q 30/00* (2006.01)
*H04N 7/167* (2006.01)

(52) U.S. Cl. ............... 705/1; 705/26; 380/231

(58) Field of Classification Search .............. 705/1, 705/26; 380/231
See application file for complete search history.

(56) References Cited

U.S. PATENT DOCUMENTS

| | | | |
|---|---|---|---|
| 5,247,575 A | 9/1993 | Sprague | |
| 5,774,654 A | 6/1998 | Maki | |
| 5,794,210 A | 8/1998 | Goldhaber et al. | |
| 5,819,092 A * | 10/1998 | Ferguson et al. | 705/39 |
| 5,825,883 A * | 10/1998 | Archibald et al. | 705/53 |
| 5,848,398 A | 12/1998 | Martin et al. | |
| 5,855,008 A | 12/1998 | Goldhaber et al. | |
| 5,864,620 A * | 1/1999 | Pettitt | 705/54 |
| 5,892,900 A * | 4/1999 | Ginter et al. | 726/26 |
| 5,982,891 A | 11/1999 | Ginter et al. | |

(Continued)

OTHER PUBLICATIONS

Robert Bellone, "A Dozen of the Hottest Verticals," (article), Apr. 1996, 10 pages, Accounting Technology, vol. 12, No., 3, p. 29, Boston.

(Continued)

*Primary Examiner*—John W Hayes
*Assistant Examiner*—Fadey S Jabr
(74) *Attorney, Agent, or Firm*—Withrow & Terranova, PLLC

(57) ABSTRACT

A method and system for providing a digital file marketplace is disclosed, where the digital marketplace includes a plurality of digital files for access by consumers over a network. The method and system include allowing a content owner to post a file on the marketplace for access by users by, providing information about the file, setting a retail price that users will be charged for downloading the file, and setting a reseller commission for the file. A first user may then search for files posted on the digital marketplace for one to resell on a third party website. A second user may further search the files posted on the digital marketplace for one to download. If the second user selects a particular file to download, then the user is charged the retail price set for the file. If the second user downloads the particular file from the third party website, then the first user is paid the reseller commission set for the file. In addition, the content owner is provided with a payment based on the retail price minus the reseller commission.

40 Claims, 10 Drawing Sheets

U.S. PATENT DOCUMENTS

| | | | |
|---|---|---|---|
| 6,009,415 A | 12/1999 | Shurling et al. | |
| 6,029,141 A | 2/2000 | Bezos et al. | |
| 6,041,316 A | 3/2000 | Allen | |
| 6,078,866 A | 6/2000 | Buck et al. | |
| 6,112,181 A * | 8/2000 | Shear et al. | 705/1 |
| 6,141,784 A | 10/2000 | Davis | |
| 6,192,407 B1 | 2/2001 | Smith | |
| 6,202,056 B1 | 3/2001 | Nuttall | |
| 6,236,971 B1 | 5/2001 | Stefik | |
| 6,247,130 B1 | 6/2001 | Fritsch | |
| 6,260,040 B1 | 7/2001 | Kauffman et al. | |
| 6,269,361 B1 | 7/2001 | Davis et al. | |
| 6,282,653 B1 | 8/2001 | Berstis | |
| 6,381,228 B1 | 4/2002 | Prieto, Jr. | |
| 6,385,596 B1 | 5/2002 | Wiser et al. | |
| 6,581,837 B1 * | 6/2003 | Hattersley | 235/462.44 |
| 6,697,944 B1 * | 2/2004 | Jones et al. | 713/168 |
| 6,721,780 B1 * | 4/2004 | Kasriel et al. | 709/203 |
| 6,742,023 B1 | 5/2004 | Fanning et al. | |
| 6,826,594 B1 | 11/2004 | Pettersen | |
| 6,961,714 B1 | 11/2005 | LeVine | |
| 7,272,645 B2 | 9/2007 | Chang et al. | |
| 7,363,498 B2 | 4/2008 | Hennessey | |
| 2001/0032154 A1 | 10/2001 | Schummer | |
| 2001/0051996 A1 | 12/2001 | Cooper et al. | |
| 2002/0007322 A1 | 1/2002 | Stromberg | |
| 2002/0048372 A1 | 4/2002 | Toh et al. | |
| 2002/0049760 A1 | 4/2002 | Scott et al. | |
| 2002/0062290 A1 * | 5/2002 | Ricci | 705/59 |
| 2002/0066026 A1 | 5/2002 | Yau et al. | |
| 2002/0077930 A1 | 6/2002 | Trubey et al. | |
| 2002/0082997 A1 * | 6/2002 | Kobata et al. | 705/51 |
| 2002/0138362 A1 | 9/2002 | Kitze et al. | |
| 2002/0146122 A1 * | 10/2002 | Vestergaard et al. | 380/231 |
| 2002/0152874 A1 | 10/2002 | Vilcauskas et al. | |
| 2003/0009578 A1 | 1/2003 | Apostolopoulos et al. | |
| 2003/0023505 A1 * | 1/2003 | Eglen et al. | 705/26 |
| 2003/0023687 A1 | 1/2003 | Wolfe | |
| 2003/0079222 A1 | 4/2003 | Boykin et al. | |
| 2003/0103645 A1 | 6/2003 | Levy et al. | |
| 2004/0037449 A1 | 2/2004 | Davis et al. | |
| 2004/0138966 A1 * | 7/2004 | Kopelman et al. | 705/27 |
| 2004/0199474 A1 | 10/2004 | Ritter | |
| 2005/0198388 A1 | 9/2005 | Teodosiu et al. | |
| 2007/0005432 A1 * | 1/2007 | Likourezos et al. | 705/14 |

OTHER PUBLICATIONS

Daniel J. Gervais, "Electronic Rights management and Digital Identifier Systems," (article), Dec. 14-15, 1998, 25 pages, Advisory Committee on Management of Copyright and Related Rights in Global Information Networks, Geneva, http://quod.lib.umich.edu/cgi/t/text/text-idx?c=jep;view=text;rgn=main;idno=3336451.0004.303.

* cited by examiner

DIGITAL FILE MARKETPLACE

CROSS-REFERENCE TO RELATED APPLICATIONS

This application is a continuation-in-part of U.S. Ser. No. 09/963,812, entitled "Method And System For Generating Revenue In A Peer-To-Peer File Delivery Network", filed on Sep. 26, 2001 and U.S. Ser. No. 60/277,787, filed on Mar. 21, 2001, both assigned to the assignee of the present application.

FIELD OF THE INVENTION

The present invention relates to a digital file(s) marketplace, and more particularly to an electronic marketplace for the buying and selling of digital files and a financial model for such a marketplace.

BACKGROUND OF THE INVENTION

The Internet may be viewed as containing distributed information and centralized information. The distributed information is located throughout the Internet and typically takes the form of domain name servers and IP addresses, for instance. The centralized information is content, such as web pages and files, which is stored on and served by central servers.

Gaining access to such centralized content, however, is becoming increasingly difficult due to growing Internet congestion, limited bandwidth, and increasing file sizes (especially for media rich content). Traditional Internet technologies for distributing content, such as e-mail, streaming media, and FTP, have proven inadequate. E-mail is inadequate because due to the number of email messages and attachments passing through email servers, restrictions are placed on the sizes of emails that restrict what can be sent as attachments. E-mail also has security issues. POP encryption is available for securing e-mails, but is not widely adopted.

Streaming media has the disadvantages of not working with all file types and is expensive because providers must purchase different software for the various streaming media standards. Streaming media also has not proven to be a reliable transfer method. FTP file transfers also have disadvantages, which include being technically challenging to most users, and suffering from inefficient file transfers. There are other solutions for distributing content, but they are usually proprietary and do not scale well.

Another problem with distributing centralized content is cost. As file sizes increase, the distribution of content is becoming increasingly expensive for content providers due to metered pricing of used bandwidth. In metered pricing, a content provider's Internet-Service-Provider (ISP) monitors the output of the servers used to provide the content, and charges the content provider 95% of the peak usage even though the average output is much lower. Thus, the cost of distributing content from central servers is one reason why attempts have been made to decentralize content.

A further problem with distributing content is that businesses have been unwilling to sell their content on the Internet because of a lack of security, and there is no efficient payment mechanism for small transactions (e.g., less than $10). Consequently, consumers do not have an adequate mechanism for efficiently finding and buying digital items, especially those that would be sold for a minor fee.

Accordingly, what is needed is a method and system for distributing digital files. The method and system should support the buying and selling of the digital files, should be reliable and secure, and should reduce transfer costs. The method and system should further provide publishers of content a secure way to sell digital files with multiple business models, while maintaining copyrights and insuring payment. The present invention addresses such needs.

SUMMARY OF THE INVENTION

The present invention is a method and system for providing a digital file marketplace, where the digital marketplace includes a plurality of digital files for access by consumers over a network. The method and system include allowing a content owner to post a file on the marketplace for access by users by, providing information about the file, setting a retail price that users will be charged for downloading the file, and setting a reseller commission for the file. A first user may then search for files posted on the digital marketplace for one to resell on a third party website. A second user may further search the files posted on the digital marketplace for one to download. If the second user selects a particular file to download, then the user is charged the retail price set for the file. If the second user downloads the particular file from the third party website, then the first user is paid the reseller commission set for the file. In addition, the content owner is provided with a payment based on the retail price minus the reseller commission.

According to the method and system disclosed herein, the digital marketplace of the present invention enables transactions between content owners, consumer, and resellers, where the combination of retail price and reseller commission that is set by the content owner automatically determines the distribution model for the files. Accordingly, the present invention provides members of the marketplace a way to find files, distribute the files across the Internet, and set appropriate pricing models for the files in real-time.

DETAILED DESCRIPTION

The present invention relates to an electronic marketplace for digital files, and more particularly to a digital file marketplace pricing model. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
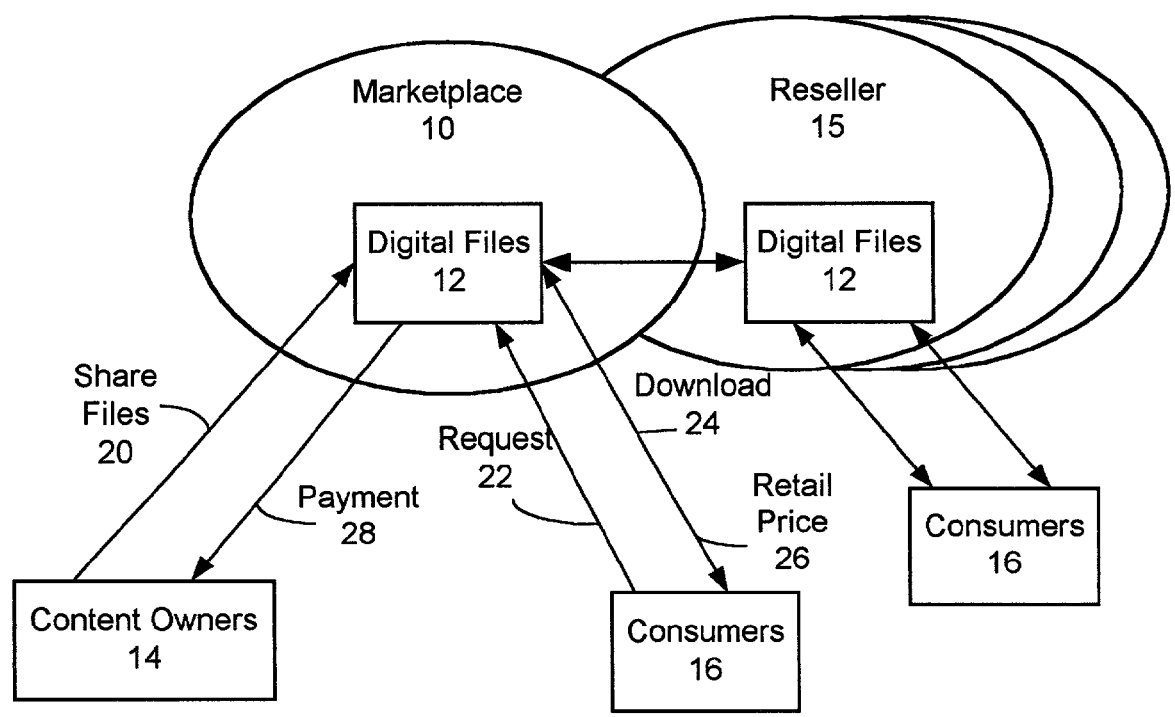
FIG. 1 is a block diagram illustrating an electronic marketplace for buying and selling digital files in accordance with a preferred embodiment of the present invention.

The present invention provides an electronic marketplace for the buying and selling of digital files, and a financial pricing model for the same. FIG. 1 is a block diagram illustrating an electronic marketplace for buying and selling digital files in accordance with a preferred embodiment of the present invention. In a preferred embodiment, the digital file marketplace 10 is a website on the Internet that matches the digital files 12 shared by content owners 14 with potential consumers 16. The content owners 14 share their digital files 12 by posting the files 12 on the marketplace 10 via line 20. Example type of content files 12 may include audio files, cell phone ring tones, video files, news articles and online magazines, image files, and confidential documents, for instance. And examples of content owners 14 include shareware publishers, musicians, artists and designers. Resellers 15 are third parties who also offer the files 12 to the public on a third party website.

Once the files 12 are posted, the consumers 16 can search for and request files 12 for downloading via line 22 either from the marketplace 10 or the reseller 15. In a preferred embodiment, consumers 16 may also request a subscription to certain files 12. After the file 12 is downloaded to the user via step 24, the consumer 16 may be charged a fee for the file 12 via line 26.

According to the present invention, the marketplace 10 allows the content owners 14 to set both the retail price charged to the consumer 16, as well as a commission paid to the reseller 15. The marketplace 10 generates revenue by charging the content owners 14 transaction fees. Thus, when the consumer 16 downloads a file 12, the consumer 16 is charged the retail price set by the owner. The transaction fee charged by the marketplace and any reseller commission is then subtracted from the retail price collected from the consumer 16. The marketplace 10 then transfers any remaining money to the content owner 14 as payment.

According to a further aspect of the present invention, the marketplace 10 allows the content owners 14 to set the retail price and the reseller commission in real-time. In addition, both the retail price and the reseller commission may be set as either positive or negative numbers, creating unique pricing models for the marketplace 10.

Figure 2:
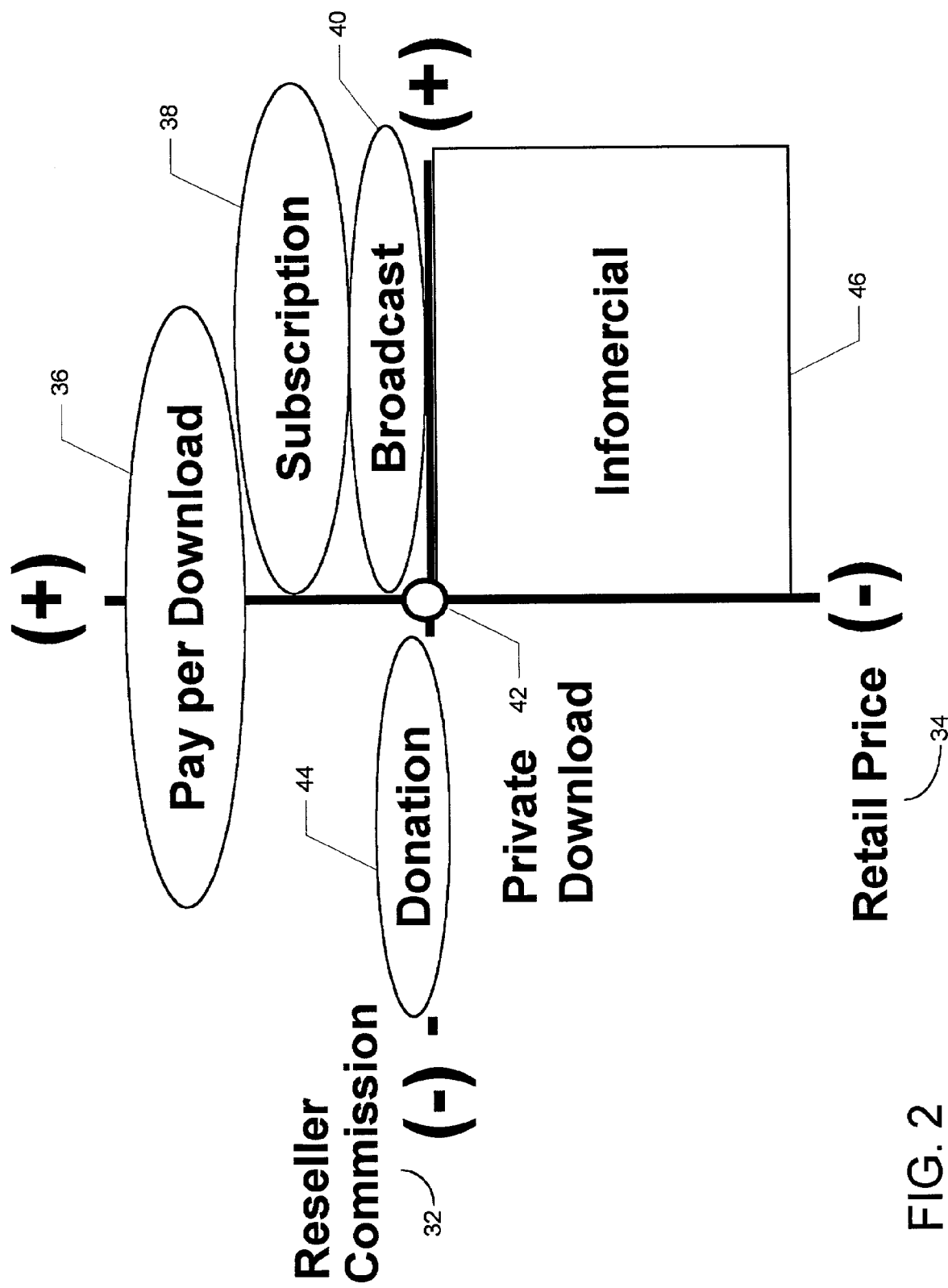
FIG. 2 illustrates a graph showing the pricing model for the marketplace that results from a combination of positive and negative retail prices and reseller commissions.

FIG. 2 illustrates a graph showing the pricing models 30 for the marketplace 10 that results from a combination of positive and negative retail prices and reseller commissions. The x-axis of the graph represents the reseller commission 32, while the y-axis represents the retail price 34. According to the present invention at least six pricing models for file downloads may be implemented within the digital marketplace 10. The pricing models 30 supported include a pay-per-download model 36, a subscription model 38, a broadcast model 40, a private download model 42, a donation model 44, and an infomercial model 46.

The pay-per-download model 36 is ideal for delivering branded content, such as music, movies, the books, and software. The pay-per-download 36 is represented when the retail price is set high and the reseller commission ranges between mid-positive and mid-negative. An example of a pay-per-download 36 is when the content owner 14 sets the retail price of a movie file at $5, and sets the reseller commission at $1. Assuming the marketplace 10 charges a $0.50 transaction fee, then the content owner 14 will receive a net payment of $3.50 per download.

The subscription model 38 is useful for delivering content such as clip art, movie trailers, and promotion music. The subscription model 38 is represented when the retail price is set at mid-positive and the reseller commission ranges from zero to positive. An example of a subscription 38 is when the content owner 14 sets the retail price of an online video show at $4.95, and sets the reseller commission at $1.00. Assuming the marketplace 10 charges a $2.45 transaction fee, then the content owner 14 will receive a net payment of $1.50 per download.

The broadcast model 40 is ideal for delivering advertising type content. The broadcast model 40 is represented when both the retail price and the reseller commission range from zero to positive. An example of a broadcast 40 is when the content owner 14 sets the retail price of an advertisement at $0.00, and sets the reseller commission at $0.05. Assuming the marketplace 10 charges a minimal transaction fee of $0.02, the content owner 14 will end up paying $0.07. However, if the advertisement results in a sale of $0.20, then the content owner 14 nets $0.13.

The private download model 42 is a file transfer between two consumers 16 and is ideal for delivering content that needs a secure delivery method and is not typically publicly available in the marketplace 10. The private download 42 is represented when both the retail price and the reseller commission are set at zero. Assuming the marketplace 10 charges a minimal transaction fee of $0.02, then whoever is transferring the file will net −$0.02.

The donation 44 occurs when the reseller pays the content owner 14 to deliver a particular file 12 to the consumer 16 for free. Thus, the donation model 44 is represented when the retail price is zero or slightly positive and the reseller commission is negative.

The infomercial model 46 is used to deliver infomercials, where the content is generally of no interest to the consumer 16, so the content owner 14 must pay the consumer 16 to download and view it. The infomercial 46 is represented when the retail price of a file 12 is negative and the reseller commission is positive.

Although not shown in FIG. 2, the marketplace 10 of the present invention also enables the reseller 15 to offer rebates to the consumers 16. Assume for example, that a reseller 15 offers to resell a content owner's file of the reseller's website and is paid a commission of $1 per copy. The reseller 15 could offer consumers $0.50 off of the retail price in order to increase the number of consumers who download the file from the reseller's website. In this model, the marketplace 10 supports a suggested resell price vs. the actual retail price, which is commonly referred to as discounting.

Thus, according to the present invention, the digital marketplace enables transactions between content owners 14, consumer 16, and resellers 15, where the combination of retail price and reseller commission set by the content owner 14 automatically determines the distribution model for the files 12. And in certain pricing circumstances, the present invention may also provide facilities to allow person-to-person money transfers.

Figure 3A:
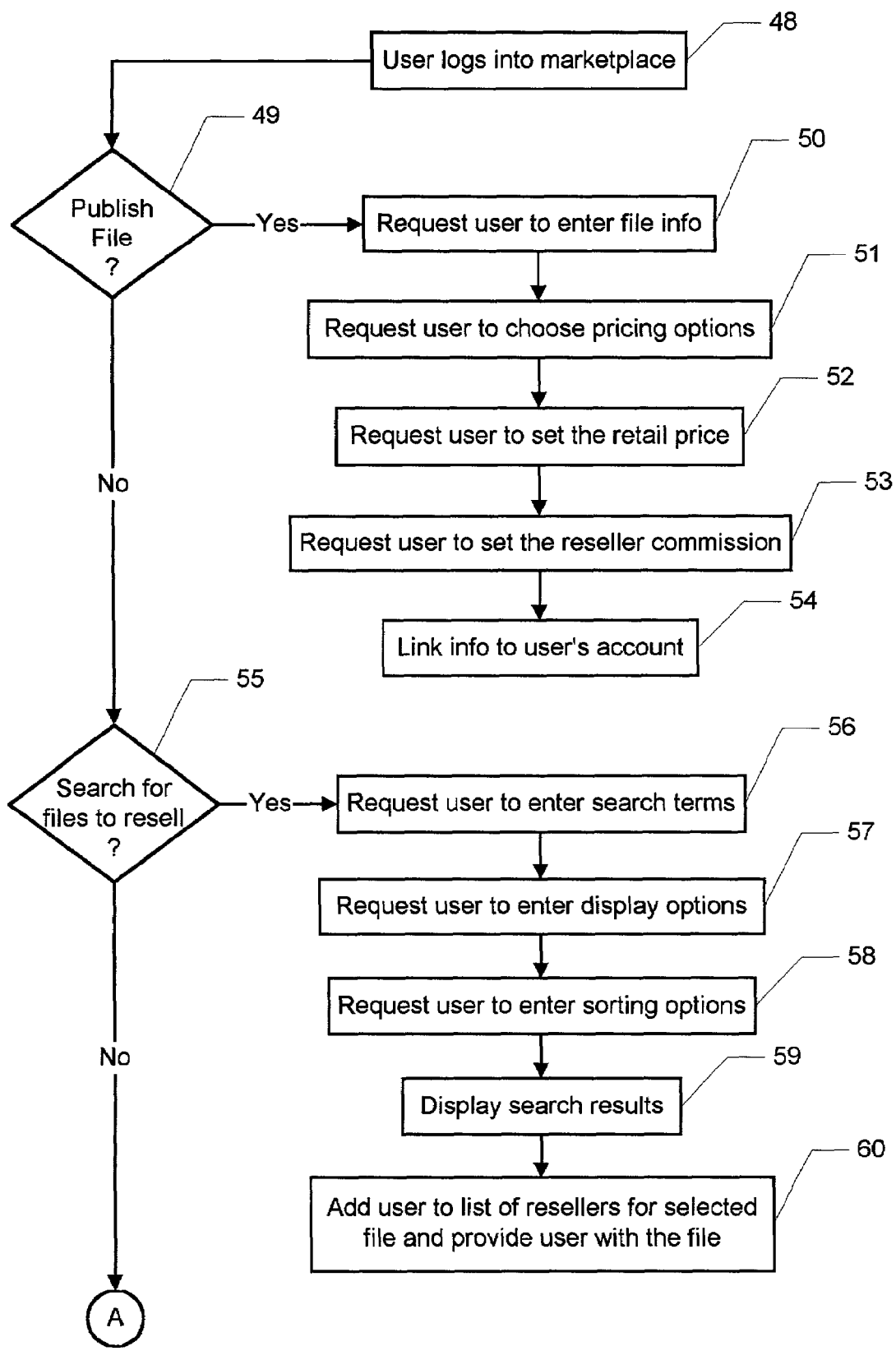
FIGS. 3A and 3B are flowcharts illustrating the process of providing an online digital marketplace for digital files in accordance with a preferred environment of the present intention.
Figure 3B:
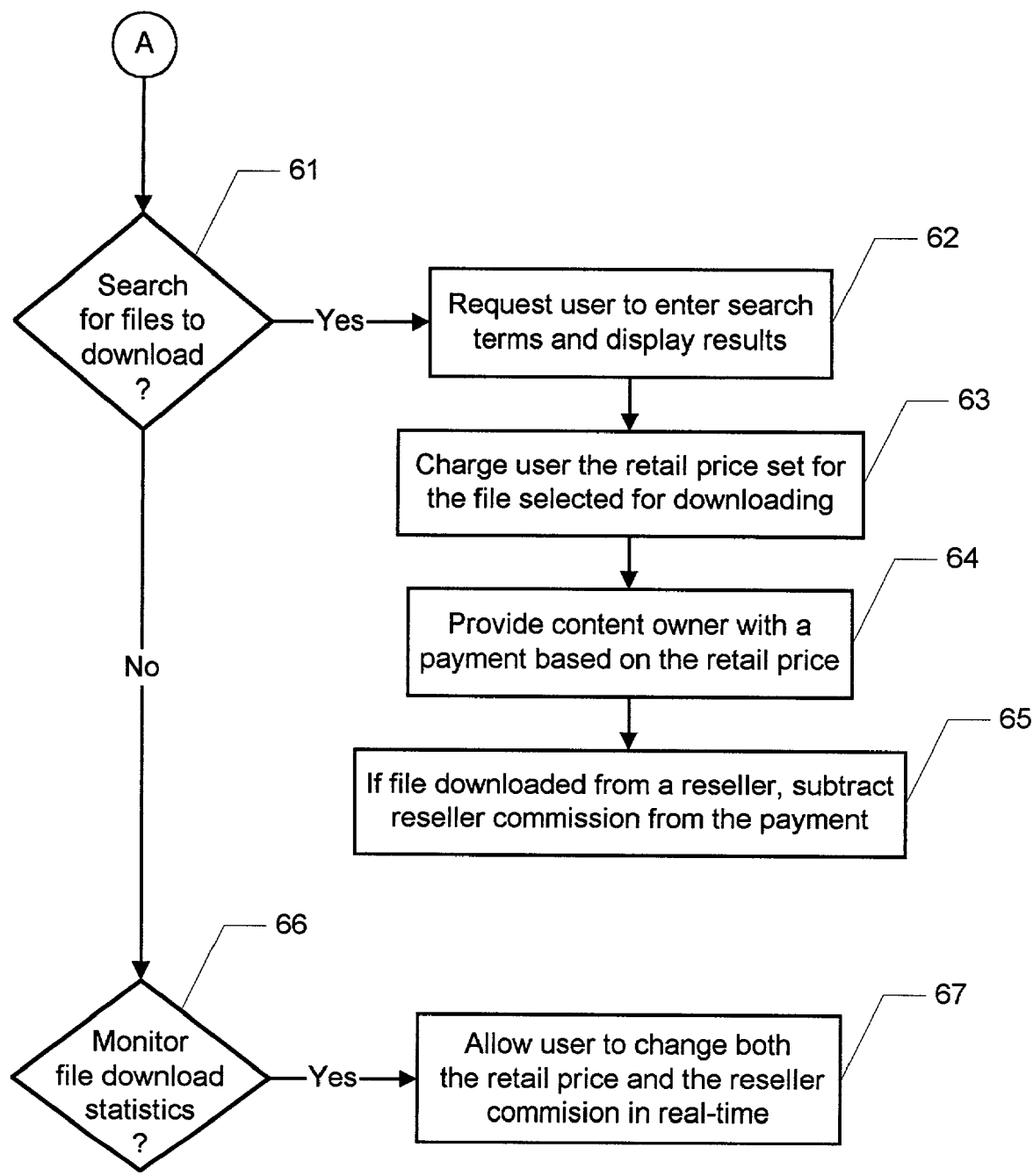

Referring now to FIGS. 3A and 3B, a flowchart illustrating the process of providing an online digital marketplace for digital files in accordance with a preferred environment of the present intention is shown. The process begins when a user of the marketplace 10 logs into the marketplace website in step 48. Depending on the options chosen by the user during his/her online session, the user may become a content owner 14, a consumer 16 and/or a reseller 15.

In step 49, it is determined whether the user has chosen the option to publish a file 12 by posting it on the marketplace 10. If the user chooses to publish a file 12, then the user is requested to enter file information in step 50, and choose pricing options for the file in step 51. In a preferred environment, the pricing options include a subscription plan, a pay-per-download, and a publisher-sponsored download.

According to the present invention, the user is also requested to set the retail price for the file in step 52, and to set the reseller commission in step 53. In response, the information the user entered is linked to the user's account for tracking the download statistics for the file in step 54. As soon as the user's file is received on the marketplace 10, the file is made available for searching by others. In a further embodiment, the user may be allowed to set a "collections" option for the file, which is a database field that enables unique views into the database to be created for viewing payment statistics for the file.

In step 55, it is determined whether the user has chosen the option to search for a file(s) 12 in the marketplace 10 to resell on a third party website. If the user chooses the option to search for files 12 to resell, then the user is requested to enter search terms in step 56. The user is also given the option to select display options to limit the search results to certain types of matching files in step 57. In a preferred embodiment, display options may include showing only free files, pay-per-download files, or files listed as resalable.

The user is also given the option to enter sorting options in step 58. In a preferred embodiment, the sorting options may include sorting the matching files by popularity, by date, by size, by price, and by the reseller commission. The search results are then displayed in step 59. Thus, according to the present invention, potential resellers may search for files having a particular content and the highest reseller price. If the user selects one or more the files to resell, the user is added to the list of resellers for the file, and the user is provided with a copy of the file or a link to the file in step 60.

In step 61, it is determined whether the user has chosen the option to search for files to download. If so, then the user is requested to enter search terms and the search results are displayed in step 62. In response to the user selecting one of the files to download, the user is charged the retail price set for the file in step 63. The content owner is then provided with a payment based on the retail price less the transaction fee in step 64. If, however, the user downloads the file from a reseller, then the reseller commission is also subtracted from the content owner's payment in step 65.

In step 66, it is determined if the user has chosen the option to monitor download statistics for the file(s) 12 that the user posted on the marketplace 10. Once viewing the download statistics for particular file, the user may choose to edit the file information and to change the retail price and the reseller commission for the file in real-time in step 67. The download statistics displayed to the user may also include information that allows the user to track usage and payments for bandwidth used to deliver the file from users and their ISP's, which will be important in the future as traffic increases and ISP's need to get paid for aiding in the file sharing.

As an example of the electronic file marketplace 10, assume that an independent film producer wants to earn money from online distribution, but doesn't have a way to distribute or to bill the end-user. The producer signs up with the file marketplace 10 and posts his films on the digital marketplace 10. The films join thousands of other media files 12 from other content owners 14 in areas such as, videos, music, ebooks, software, and games. In addition, the publisher sets the retail price and the reseller commission, and can choose to make the films available as a subscription service to the end-users. Assume further that a user logs onto the marketplace 10 and finds one of the films during a search and downloads the film. The user's account would be charged the retail price for the file. The producer would be paid the retail price collected for that file, less any transaction fee charged by the marketplace 10 and reseller commission.

In a further aspect of the present invention, the content owner 14 may also monitor and dynamically change the retail price and reseller commission for their files in real-time. The digital marketplace 10 links the download activities of the producer's files to the producer's account, so the producer may log-in and monitor who is downloading which files and at what costs. While monitoring the download activity of his films, the publisher notices that consumer demand is higher than expected, so he may decide that the consumers 16 should pay more to download the films. The producer may also decide that he is paying the resellers too much to distribute the films, and wants to keep more of the retail price for himself. Therefore, the producer would raise the retail price of the films and lower the reseller commissions, and the changes would take place in real-time.

Although the preferred embodiment of the present invention is described in terms of a marketplace website, the present invention may also be implemented as a peer-to-peer network to effectively distribute bandwidth and increase efficiency at which the files 12 are delivered to the consumers 16. In the peer-to-peer network embodiment, consumers 14 may donate unused bandwidth of their computers to the marketplace 10 for the delivery of files 12 to other consumers 14, thereby increasing the bandwidth allocation of the network. The affiliates of the network are paid as an incentive for donating bandwidth to the network, and for referring new consumers 16 to the marketplace 10.

Figure 4A:
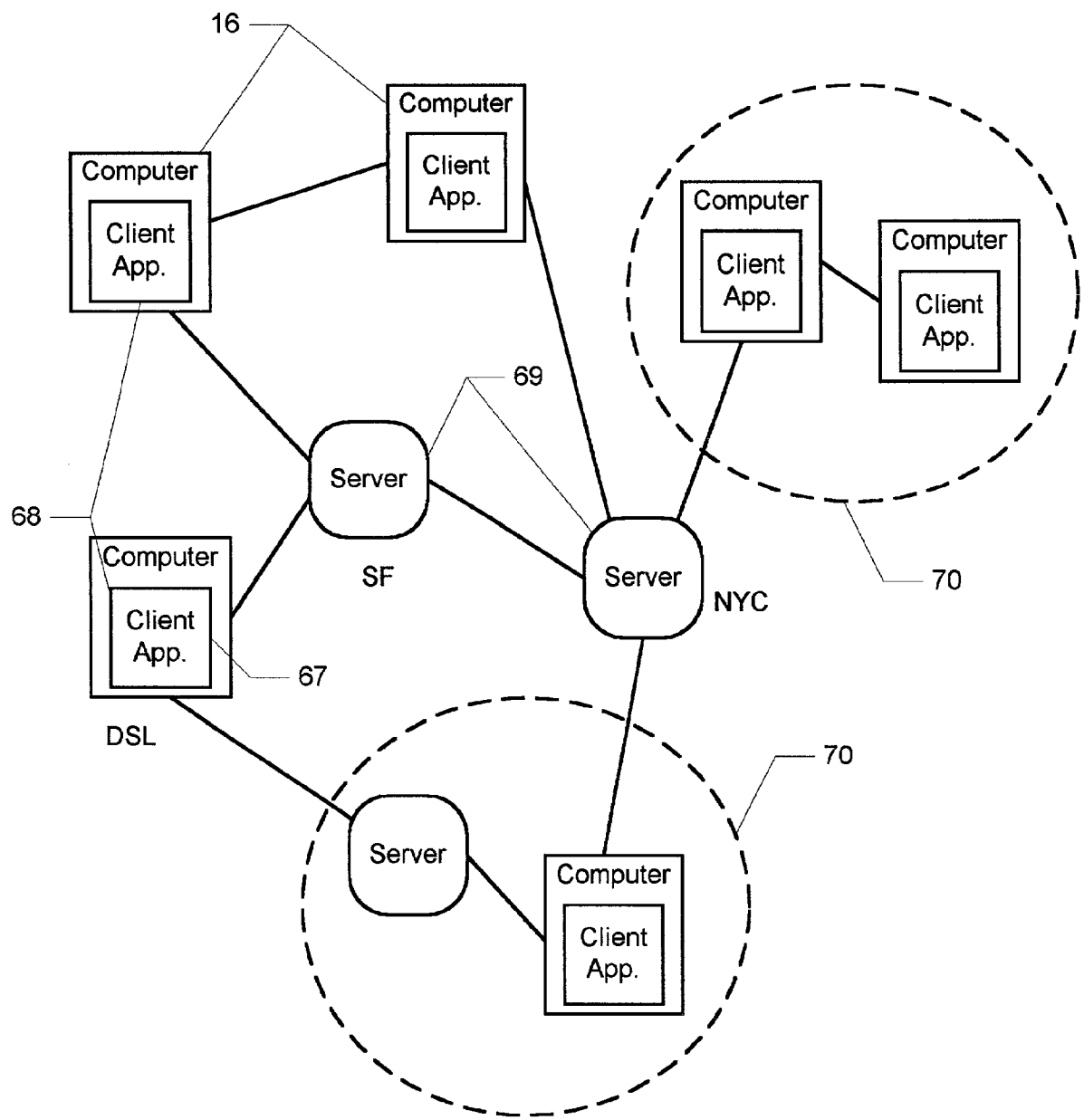
FIGS. 4A and 4B are block diagrams illustrating a peer-to-peer (P2P) network architecture in accordance with one preferred embodiment of the present invention.
Figure 4B:
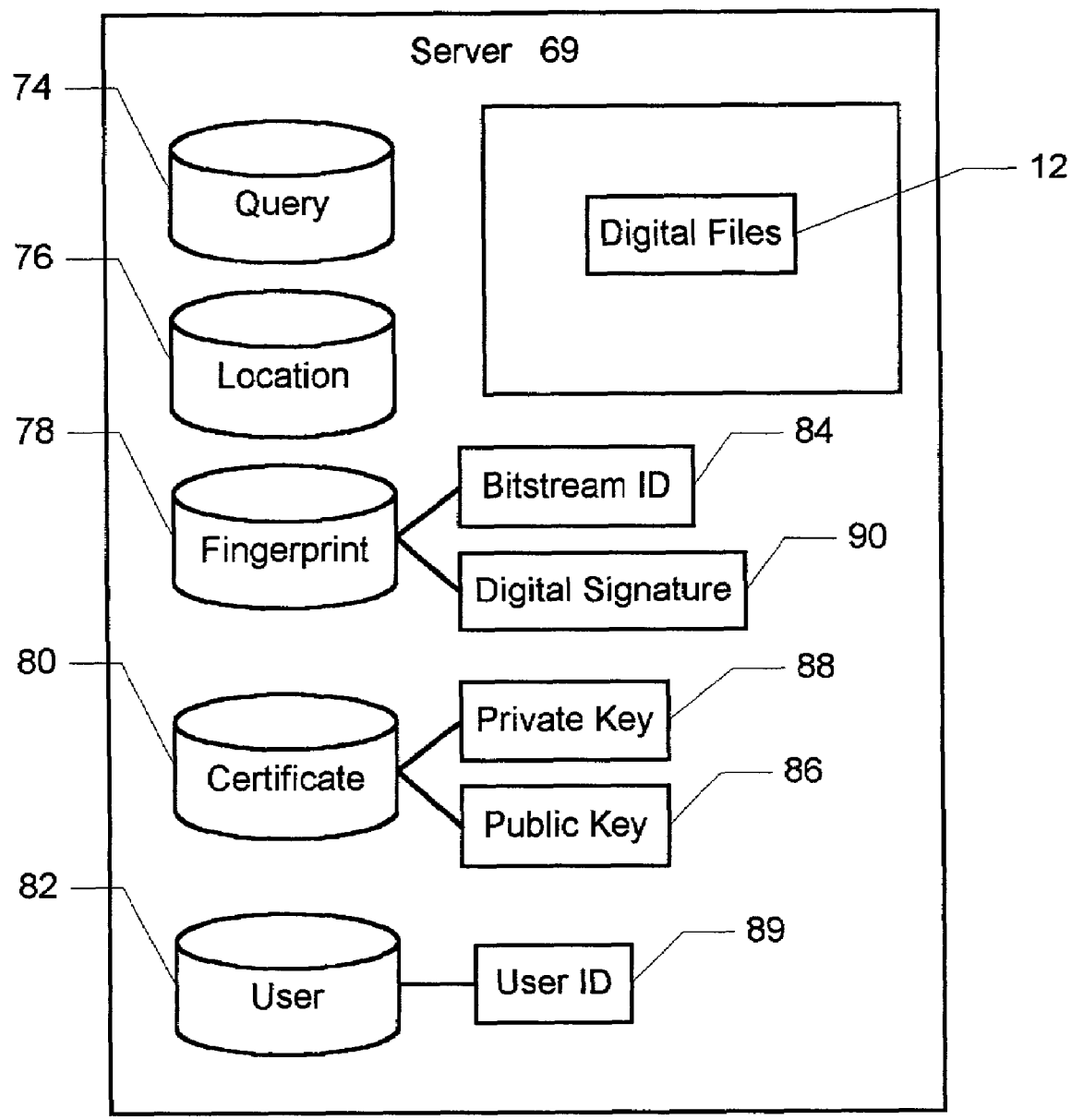

FIGS. 4A and 4B are block diagrams illustrating a peer-to-peer (P2P) network architecture in accordance with one preferred embodiment of the present invention. The peer-to-peer network 64 includes a plurality of computers 16 interconnected over a public network, such as Internet, where some of the computers 16 are configured as server nodes 69, and other computers 16 are configured as client nodes 68. A client node 68 may represent a single computer or a proprietary network, such as AOL, or a cable network, for example, and in a preferred embodiment, the server nodes 69 are located worldwide. The network enables secure and reliable peer-to-peer file sharing between client nodes 68 where consumers 16 may share content using both 1-to-1 and 1-to-many file transfers without the need for going through a server. The network also enables subscription-based decentralized file downloads to the client nodes 68, where consumers 16 may schedule delivery of content over the network.

Any combination of server nodes 69 and client nodes 68 may form extranets 70 that are protected by firewalls (not shown). As is well known in the art, an extranet 70 is basically a private network that uses the public Internet as its transmission system, but requires passwords to gain entrance.

The primary purpose of the peer-to-peer network 64 is the propagation of content over the network. FIG. 4B is a diagram illustrating contents of the server nodes 69. A server node 69 as used herein may refer to any computer that combines hosting services with databases. Although not shown, the marketplace 10 website shown in FIG. 1 includes a server node 69 as described herein. In a preferred embodiment, each server node 69 stores commercial digital files 12 (or access the files 12 from a remote database). Both the content owners 14 and the consumers 16 have a vested interest in secure and reliable delivery of the files 12. A user's files 12 may reside on the server nodes 69 on a client node 68, or both. The present invention makes no distinction; it is only a matter of where the file is retrieved for delivery to another node during file sharing.

Consumers 14 configure their computers 16 as client nodes 68 by installing and running a P2P client application 67 designed for public networks that operates as described herein. In operation, the client application 67 allows the client node 68 to authenticate other client nodes 68 and to both receive files 12 and serve files 12.

The server nodes 69 facilitate the file sharing process by performing a combination of the following functions. A first function of the server nodes 69 is to process search requests from the client nodes 68 for files 12 and to provide the results. A second function of the server nodes 69 is to aid the client nodes 68 in authenticating other client nodes 68 and file transfers during direct client-node transfers. A third function is content delivery, which includes a) providing subscription-based decentralized file downloads that allow the client nodes 68 to subscribe and automatically receive periodically updated files 12 (push technology), and b) storing files 12 when a client node 68 publishes a file for subsequent delivery to a requester by the server when the publishing node is off-line. A fourth function of the server nodes 69 (and the client nodes) is to serve as proxies to the extranets 70 so that the client nodes 68 inside the extranets 70 can be part of the peer-to-peer network through the extranet 70 firewalls.

As shown in FIG. 4B, in a preferred embodiment of the present invention, each server node 69 includes several databases for implementing the functions described above. The server node 69 includes a query database 74, a location database 76, a fingerprint database 78, a certificate database 80, and a consumer database 32. The query and a location databases 74 and 76 store the names and locations of the files 12 shared on the network, respectively. The fingerprint database 78 stores fingerprint information that has been generated for each file for determining the authenticity of the files 12. The certificate database 80 contains certificate information to certify and verify the authenticity of all consumers 16 of the file network 64. And the consumer database 32 includes account information for the consumers 16 of the client nodes 68.

FIGS. 5A-5D are flow charts illustrating the process for providing secure and reliable file sharing in a peer-to-peer network in accordance with a preferred embodiment of the present invention. The process begins by allowing a consumer to become a member of the network by downloading and installing a copy of the P2P client application 67 on the consumer's computer in step 100. In a preferred embodiment, the P2P client application 67 is downloaded from one of the server nodes 69, although the P2P client application 67 may be obtained from other sources.

Next, the server node 69 receives registration information entered by the consumer in step 102, which can include credit card information, home address, e-mail address, and demographic information for direct marketing purposes. In response, the server node 69 generates account information for the consumer, including a digital certificate that includes a public key 86 and a private key 88 in step 104. The consumer's account information, such as the consumer ID 89, is stored in the consumer database 82, and the consumer's public key 86 and private key 88 are stored in the certificate database 80 in step 106. When registration is complete, the consumer is notified and may then execute the P2P client application 67 in step 107. At any point during the registration process, the consumer may be requested to deposit a sum of money to his or her account, which will be used for fee-based file in which the fees are deducted from the consumer's account based on usage.

Once the client node 68 invokes the client application 67, a client application 67 desktop window (not shown) is displayed on the computer in which the consumer may search for files 12 on the network.

Figure 5A:
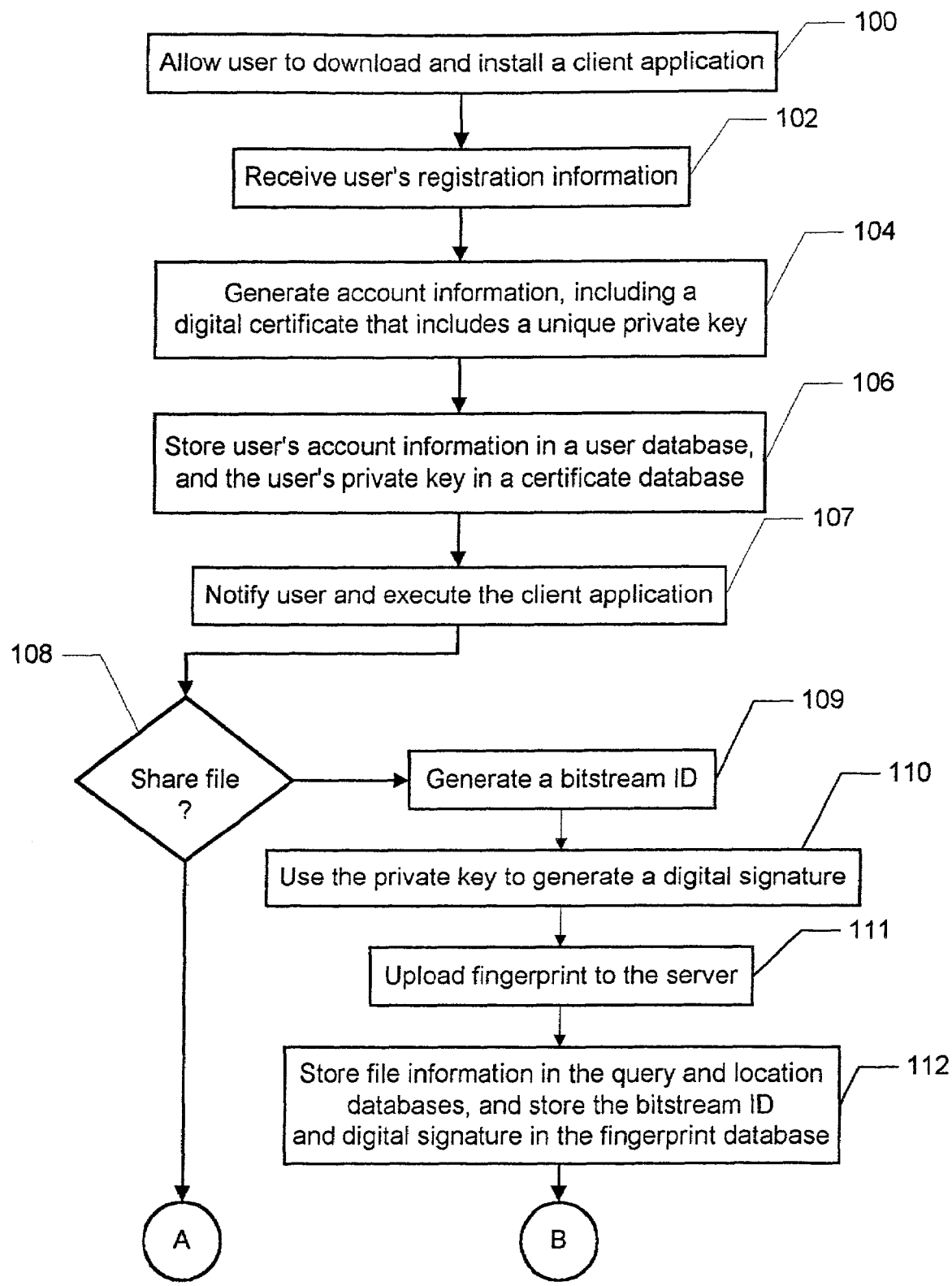
FIGS. 5A-5D are flow charts illustrating the process for providing secure and reliable file sharing in the peer-to-peer network.
Figure 5B:
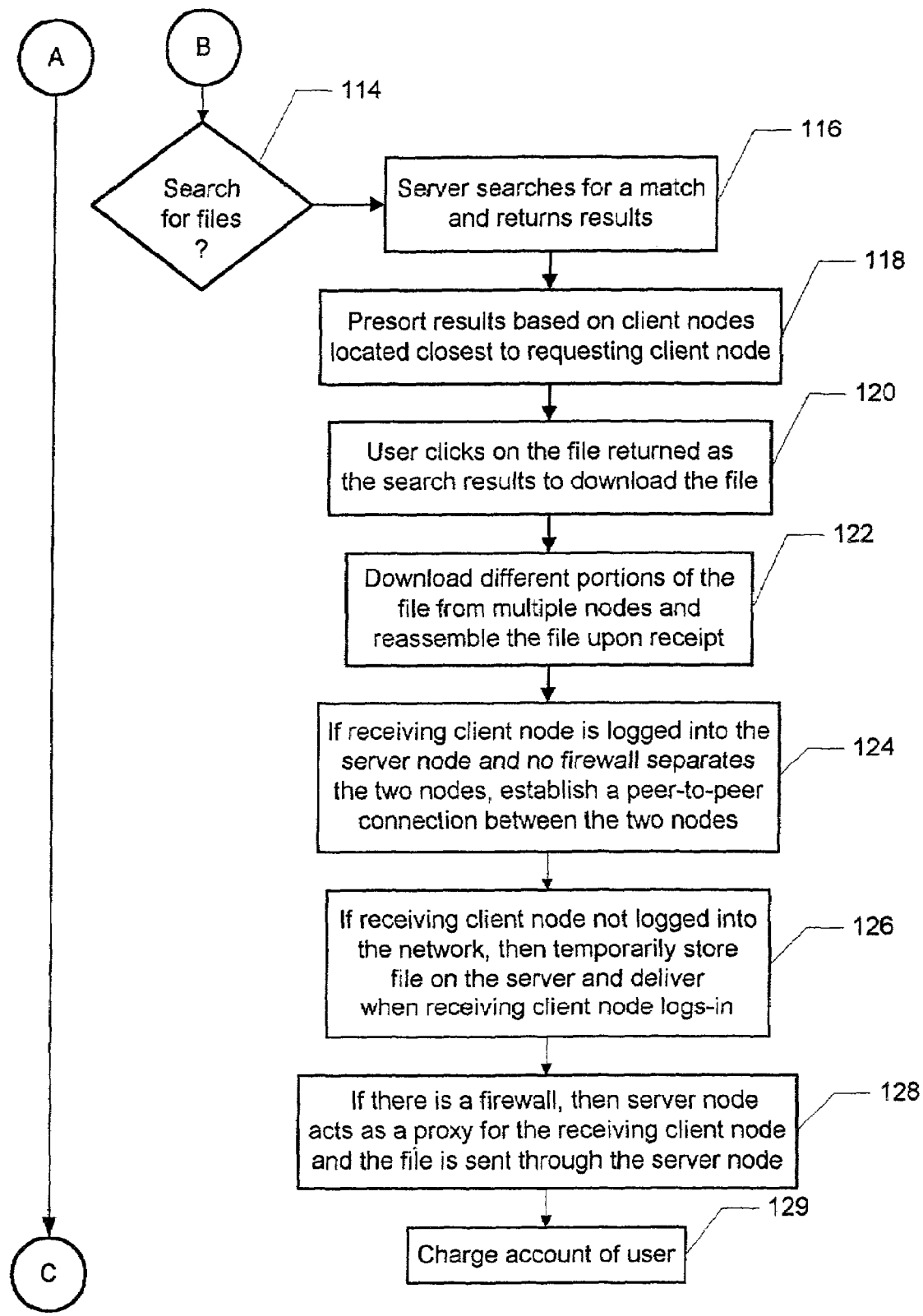
Figure 5C:
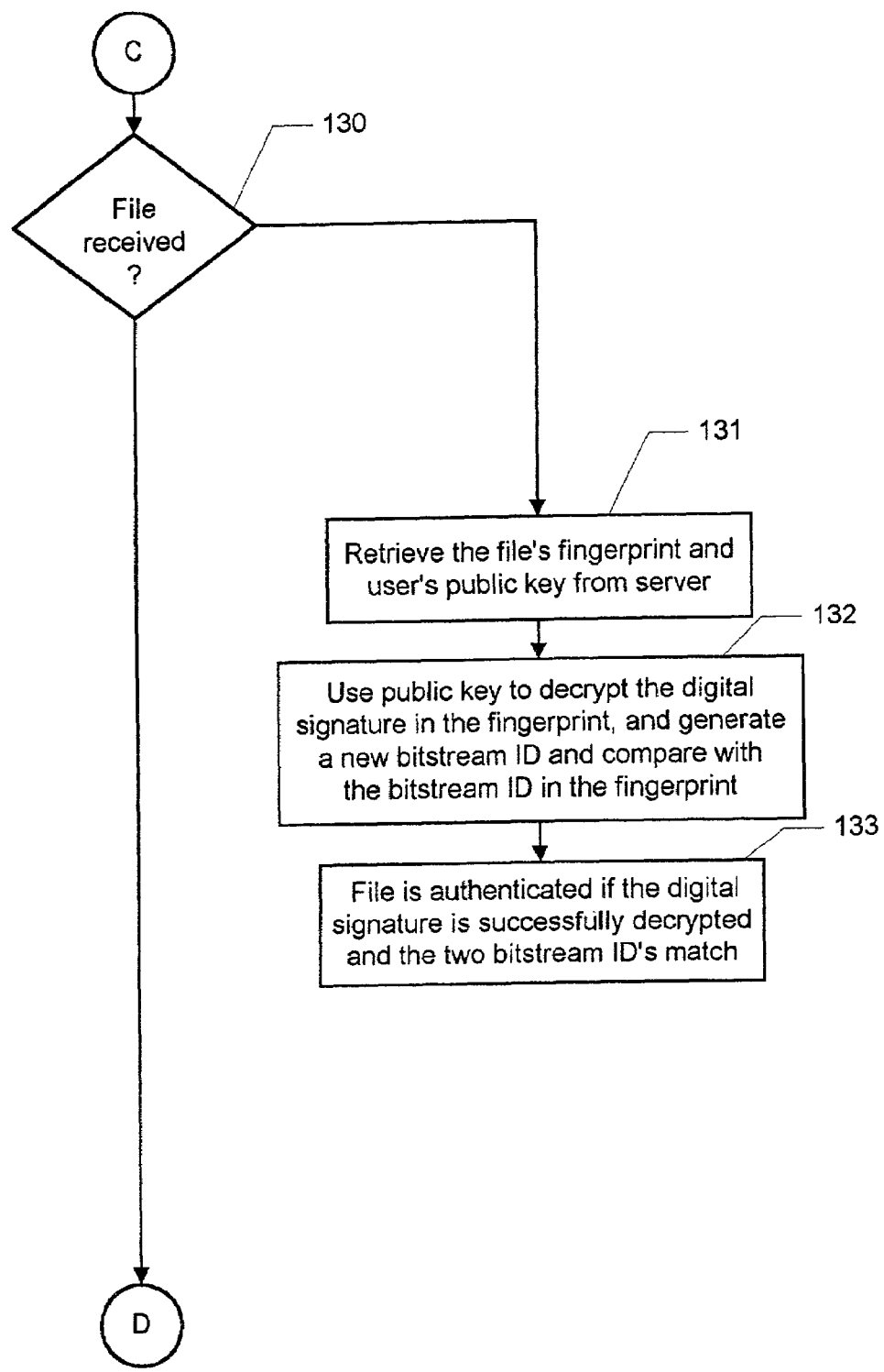
Figure 5D:
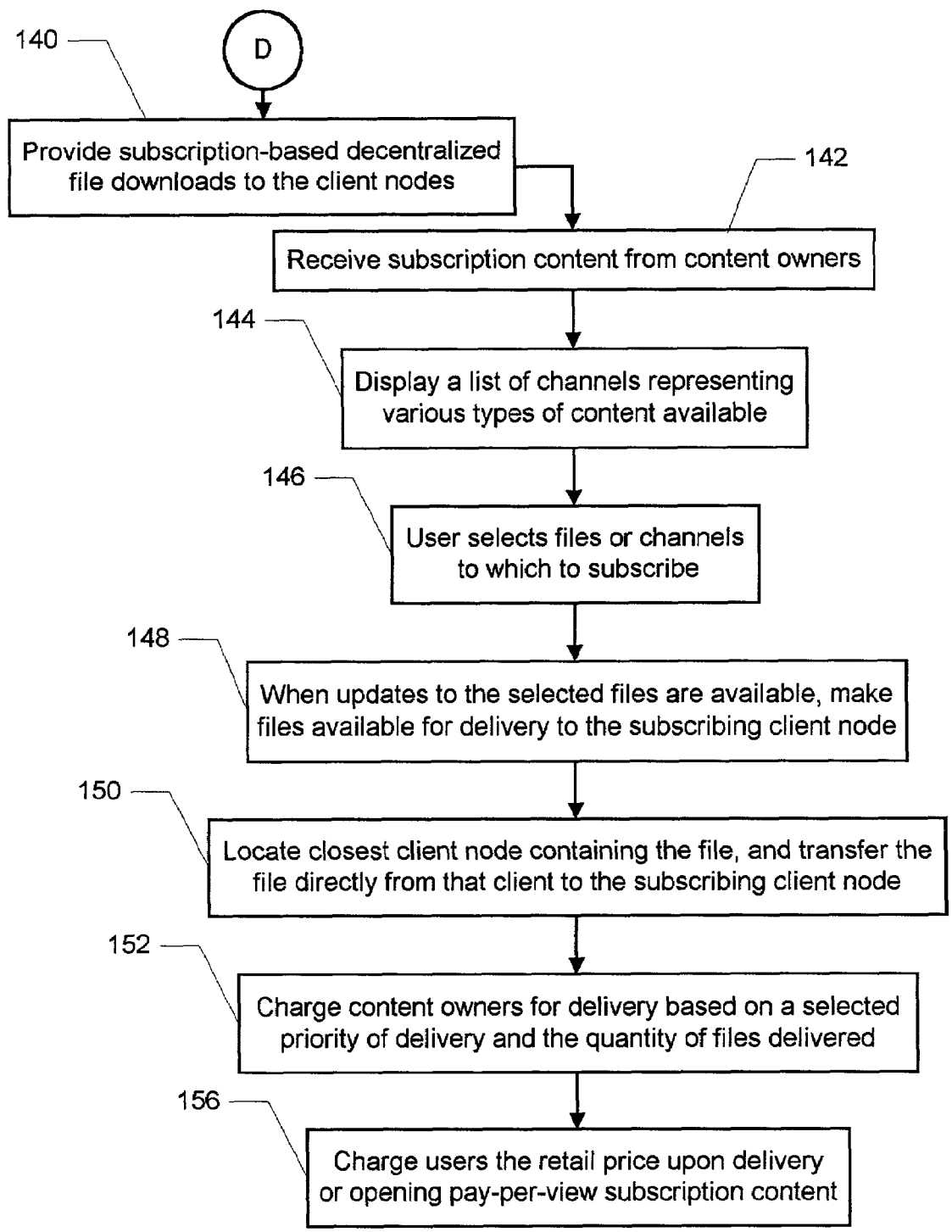

Referring to both FIGS. 5A and 5C-5D, the P2P client application 67 allows the consumer to perform four primary functions: share files 12 over the network in step 108, search for a file 12 to download and download the file 12 in step 114, receive files 12 over the network in step 130, and subscribe to file over the network in step 140.

The content owner 14 may share pre-approved files 12 on the network in step 108 either publicly or privately. In accordance with the present invention, secure file transfers are enabled by creating a fingerprint for each file when the file is published via steps 109-112. Referring to both FIGS. 3B and 5A, first, the P2P client application 67 generates a bitstream ID 84 for the file in step 109. In a preferred embodiment, the bitstream ID 84 is generated by calculating binary values in data blocks of the file itself. The P2P client application 67 then uses the private key 88 to generate a digital signature 90 for the file in step 110. In an alternative embodiment, the private key 88 may also be used to encrypt the bitstream ID. Together, the bitstream ID 84, the file information, and the digital signature 90 form the fingerprint for the file. The fingerprint ensures that the file is transmitted in its original state (data integrity) by the identified consumer/publisher.

After the fingerprint is generated, the fingerprint is uploaded to the server node 69 in step 111 if it matches with a fingerprint in a file authority. The file information is stored in the query and location databases 74 and 76, and the bitstream ID 84 and digital signature 90 are stored in the fingerprint database 78 under an entry for the file in step 112. Preferably, the name of the file is stored in the query database 74, while attributes of the file, such as the identity of the consumer/publisher and the publishing node, the file size, the bit rate of the file, and so on, are stored in the location database 76. After the file fingerprint has been uploaded, the file is ready for transmission over the network 64.

The consumer may also search for files 12 on the network in step 114 by entering search terms. In response, the server node 69 searches for a match for the search terms in the query database in step 116.

In a further aspect of the present invention, instead of just displaying a list of matching file names, the server examines the entries for the files 12 in the location database 76, presorts the matches based on the files 12 that are located closest to the requesting client node, and returns the results in step 118. The criteria for determining the closest client nodes 68 include geographic location, bandwidth speed, and current network traffic. In a preferred embodiment, the server node 69 may return a list of the highest-ranking files 12 to the client node, but only displays the highest-ranking file name to the consumer, rather than a list of redundant files 12. The consumer may then click on the file returned as the search result to have the file downloaded in step 120.

In conventional peer networks, if the file is downloaded from one node to another, and the first node logs-off during the transfer, then file delivery will fail. The present invention further ensures reliable delivery using multiple and partial file transfers. To download a file, the client node 68 downloads different portions of the file from different thus nodes (e.g., downloading ⅓ of the file from three different nodes), and then reassembles the file upon receipt in step 122. If one node goes off-line, an alternate will be selected.

If the receiving client node(s) are logged into the server node 69 and there are no firewalls nodes in step 124, then a peer-to-peer connection is established between the two nodes and the file is sent directly to the receiving node without first going through the server node. If the receiving client node(s) are not logged into the network, then the file may be temporarily stored on the server node 69 and delivered by the server node 69 when receiving client node 68 logs-in in step 126.

If a firewall separates the publishing client node 68 from the receiving client node, then the server node 69 acts as a proxy for the receiving client node 68 and the file is sent through the server node 69 in step 128. In a preferred embodiment, any node in the network may serve as a proxy for a firewall-protected node, as described in U.S. patent application 67 Ser. No. 09/773,314, entitled "Method And System For Facilitating File Access From Firewall-Protected Client nodes In A Peer-To-Peer Network, flied on Jan. 31, 2001, and hereby incorporated by reference.

After the file is delivered to the recipient(s), the client account of the consumer who downloaded the file may be charged a fee in step 129.

A file is received by a client node 68 in step 130 after the file has been downloaded in step 134. The client application 67 begins the authentication process by retrieving the fingerprint associated with the file and the consumer's public key from the server node 69 in step 131. Alternatively, the public key may be retrieved from the sender. Please note, that a secure file retrieval is also possible without having the peer application installed on a computer.

The public key is used to decrypt the digital signature 90 in the fingerprint, and a new bitstream ID is generated and compared with the bitstream ID 84 in the fingerprint in step 182. If the digital signature is successfully decrypted and the two bitstream ID's match, then the file is authenticated in step 133. In the embodiment where the bitstream ID is encrypted, the encrypted bitstream ID in the fingerprint must be decrypted with the public key before the comparison. Fingerprinting files 12 as described herein allows the receiving node to determine the authenticity of both the file and the publisher.

In accordance with a further aspect of the present invention, the network also provides subscription-based decentralized file downloads to the client nodes 68, in which a consumer subscribes to files 12 on the network through the P2P client application 67 on a fee and non-fee basis in step 140. The subscription files 12 is received from content owners 14 and authors who contract with the network to deliver the files 12 to consumers 16 in step 142. Examples of content owners 14 and authors include movie studios, software publisher, game publishers, and record labels. The subscription files 12 may include any combination of free subscription file, pay-per-use and subscription file, and marketing file.

In a preferred embodiment, the client application 67 displays a "channels" folder (not shown) containing a list of channels representing various types of file available in step 144. Examples of channels include video channels, news channels, and software updates that are frequently updated and/or subject to new versions. The consumer may then select files 12 or channels to which to subscribe to receive copies of the files 12 in step 146. The files 12 may include any combination of audio, video, text and graphics. Through the subscription feature of the present invention, consumers 16 are provided with the ability to select future versions of file.

When updates to the selected files 12 are available, the files 12 are made available for delivery to the subscribing client node 68 in step 148. In one preferred embodiment, the client node 68 contacts the server node 69 for a list of available files 12 at predetermined time intervals, and then makes a download request for the files 12. In an alternative preferred embodiment, the server node 69 automatically initiates the download.

According to the present invention, to deliver a particular file to a subscribing client node, the server node 69 locates the closest client node 68 containing the file, end the file is transferred directly from that client to the subscribing client node 68 in step 150. Marketing files may be delivered in the same manner. As described above, the closest client node 68 is determined using factors including geographic location, bandwidth speed, and current network traffic. Once the file has been downloaded to the subscribing client node, the file may then be hosted from that client node 68 for other subscribing client nodes 68.

The content owners 14 are charged for delivery based on a priority of delivery they select and the quantity of files 12 delivered in step 152. For pay-peruse and subscription file, the consumer are charged the retail price upon delivery or opening of the file in step 156.

By serving copy of the files 12 peer-to-peer (and through affiliate servers), rather than from the server node 69, the present invention efficiently utilizes unused bandwidth of the client nodes 68. Thus, the present invention utilizes push technology to even out bandwidth distribution by transferring files 12 during off-peak hours to take advantage of idle bandwidth of the client nodes 68. For a worldwide network, this means that at some point during the day, there is always idle network bandwidth available for delivering subscription files 12. Consequently, the present invention greatly reduces bandwidth cost for the network since the files 12 are served directly from client-to-client on a request basis, rather from the server node 69 to all of the client nodes 68. These principles may also be employed when files 12 are pushed from the server nodes 69 12.

The file network of the present invention also allows for the enforcements of copyrights on request. When a third party notifies the network that a particular file is copyrighted and is being copied without permission on network, all references to the file are deleted from the query, location, fingerprint, and certificate databases. Without these references, the file will no longer be available for sharing on the network. In addition, original publishers of copyright infringing file can be tracked. In addition, the financial model for the network allows infringers to be easily identified and located since this information is collected from each consumer in order join the network.

A method and system for providing a pricing model for a digital file marketplace has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing an online digital marketplace, the digital marketplace having a plurality of digital files for access by consumers over a network, the method comprising the steps of:
   (a) allowing a content owner to post a file on the marketplace for access by users by,
      (i) providing information about the file by a first computing device,
      (ii) setting a retail price that users will be charged for downloading the file by the first computing device, and
      (iii) setting a reseller commission for the file by the first computing device;
   (b) allowing a first user to search for files posted on the digital marketplace for one to resell on a third party website;
   (c) allowing a second user at a second computing device to search the files posted on the digital marketplace for one to download;

(d) if the second user selects a particular file to download, charging the user the retail price set for the file;

(e) if the second user downloads the particular file from the third party website, paying the first user the reseller commission set for the file; and (f) paying the content owner a payment based on the retail price minus the reseller commission.

2. The method of claim 1 further including the step of:

(g) allowing the content owner to monitor download statistics for the file the content owner posted and to change the retail price and the reseller commission for the file in real-time.

3. The method of claim 1 further including the step of:

(g) generating revenue for the digital marketplace by subtracting a transaction fee from the payment made to the content owner.

4. The method of claim 1 wherein step (a) further includes the step of:

(iv) allowing the content owner to set the retail price and the reseller commission both positively and negatively.

5. The method of claim 4 wherein step (a) further includes the step of:

(v) requesting the content owner to choose pricing options for the file, including a subscription plan, a pay-per-download, and a publisher-sponsored download.

6. The method of claim 1 wherein step (b) further includes the step of:

(i) requesting the first user to enter display options for the search.

7. The method of claim 6 wherein step (b)(i) further includes the step of:

including as the display options showing free files, pay-per-download files, or files listed as resalable.

8. The method of claim 1 wherein step (b) further includes the step of:

(i) requesting the first user to enter sorting options for the search.

9. The method of claim 8 wherein step (b)(i) further includes the step of: including as the sorting options sorting the matching files by popularity, by date, by size, by price, and by the reseller commission.

10. The method of claim 3 further including the step of implementing the digital marketplace as a website on a network.

11. The method of claim 3 further including the step of: implementing the digital marketplace as a peer-to-peer network.

12. A computer-readable medium containing program instructions for providing an online digital marketplace, the digital marketplace having a plurality of digital files for access by consumers over a network, the computer-readable medium comprising the instructions of:

(a) allowing a content owner to post a file on the marketplace for access by users by, (i) providing information about the file, (ii) setting a retail price that users will be charged for downloading the file, and (iii) setting a reseller commission for the file;

(b) allowing a first user to search for files posted on the digital marketplace for one to resell on a third party website;

(c) allowing a second user to search the files posted on the digital marketplace for one to download;

(d) if the second user selects a particular file to download, charging the user the retail price set for the file;

(e) if the second user downloads the particular file from the third party website, paying the first user the reseller commission set for the file; and (f) paying the content owner a payment based on the retail price minus the reseller commission.

13. The computer-readable medium of claim 12 further including the instruction of:

(g) allowing the content owner to monitor download statistics for the file the content owner posted and to change the retail price and the reseller commission for the file in real-time.

14. The computer-readable medium of claim 12 further including the instruction of:

(g) generating revenue for the digital marketplace by subtracting a transaction fee from the payment made to the content owner.

15. The computer-readable medium of claim 12 wherein instruction (a) further includes the instruction of:

(iv) allowing the content owner to set the retail price and the reseller commission both positively and negatively.

16. The computer-readable medium of claim 15 wherein instruction (a) further includes the instruction of:

(v) requesting the content owner to choose pricing options for the file, including a subscription plan, a pay-per-download, and a publisher-sponsored download.

17. The computer-readable medium of claim 12 wherein instruction (b) further includes the instruction of:

(i) requesting the first user to enter display options for the search.

18. The computer-readable medium of claim 17 wherein instruction (b)(i) further includes the instruction of: including as the display options showing free files, pay-per-download files, or files listed as resalable.

19. The computer-readable medium of claim 12 wherein instruction (b) further includes the instruction of:

(i) requesting the first user to enter sorting options for the search.

20. The computer-readable medium of claim 19 wherein instruction (b)(i) further includes the instruction of: including as the sorting options sorting the matching files by popularity, by date, by size, by price, and by the reseller commission.

21. The computer-readable medium of claim 14 further including the instruction of:

implementing the digital marketplace as a website on a network.

22. The computer-readable medium of claim 21 further including the instruction of:

implementing the digital marketplace as a peer-to-peer network.

23. A method for providing an online digital marketplace, the digital marketplace having a plurality of digital files for access by consumers over a network, the method comprising the steps of:

(a) allowing a content owner to post a file on the marketplace for access by users by, (i) providing information about the file by a first computing device, (ii) setting a retail price that users will be charged for downloading the file by the first computing device, and (iii) setting a reseller commission for the file by the first computing device, wherein both the retail price and the reseller commission may be set positively and negatively;

(b) allowing a first user to search for files posted on the digital marketplace for one to resell on a third party website;

(c) allowing a second user at a second computing device to search the files posted on the digital marketplace for one to download;
(d) if the second user selects a particular file to download, charging the user the retail price set for the file;
(e) if the second user downloads the particular file from the third party website, paying the first user the reseller commission set for the file;
(f) paying the content owner a payment based on the retail price minus the reseller commission; and
(g) allowing the content owner to edit the file information and to change the retail price and the reseller commission in real-time.

24. The method of claim 23 further including the step of:
(h) generating revenue for the digital marketplace by subtracting a transaction fee from the payment made to the content owner.

25. The method of claim 24 wherein step (a) further includes the step of:
(iv) requesting the content owner to choose pricing options for the file, including a subscription plan, a pay-per-download, and a publisher-sponsored download.

26. The method of claim 25 wherein step (b) further includes the step of: (i) requesting the first user to enter display options for the search.

27. The method of claim 26 wherein step (b)(i) further includes the step of: including as the display options showing free files, pay-per-download files, or files listed as resalable.

28. The method of claim 23 wherein step (b) further includes the step of:
(i) requesting the first user to enter sorting options for the search.

29. The method of claim 28 wherein step (b)(i) further includes the step of: including as the sorting options sorting the matching files by popularity, by date, by size, by price, and by the reseller commission.

30. The method of claim 24 further including the step off implementing at least six pricing models for file downloads within the digital marketplace, including a pay-per-download a model, a subscription model, a broadcast model, a private download model, a donation, and an infomercial model.

31. The method of claim 25 further including the step of: implementing the digital marketplace as a website on a network.

32. The method of claim 31 further including the step of: implementing the digital marketplace as a peer-to-peer network.

33. A computer-readable medium containing program instructions for providing an online digital marketplace, the digital marketplace having a plurality of digital files for access by consumers over a network, the computer-readable medium comprising the instructions of:
(a) allowing a content owner to post a file on the marketplace for access by users by,
(i) providing information about the file,
(ii) setting a retail price that users will be charged for downloading the file, and
(iii) setting a reseller commission for the file, wherein both the retail price and the reseller commission may be set positively and negatively;
(b) allowing a first user to search for files posted on the digital marketplace for one to resell on a third party website;
(c) allowing a second user to search the files posted on the digital marketplace for one to download;
(d) if the second user selects a particular file to download, charging the user the retail price set for the file;
(e) if the second user downloads the particular file from the third party website, paying the first user the reseller commission set for the file;
(f) paying the content owner a payment based on the retail price minus the reseller commission; and
(g) allowing the content owner to edit the file information and to change the retail price and the reseller commission in real-time.

34. The computer-readable medium of claim 33 further including the instruction of:
(h) generating revenue for the digital marketplace by subtracting a transaction fee from the payment made to the content owner.

35. The computer-readable medium of claim 34 wherein instruction (a) further includes the instruction of:
(iv) requesting the content owner to choose pricing options for the file, including a subscription plan, a pay-per-download, and a publisher-sponsored download.

36. The computer-readable medium of claim 35 wherein instruction (b) further includes the instruction of:
(i) requesting the first user to enter display options for the search.

37. The computer-readable medium of claim 36 wherein instruction (b)(i) further includes the instruction of: including as the display options showing free files, pay-per-download files, or files listed as resalable.

38. The computer-readable medium of claim 37 wherein instruction (b) further includes the instruction of:
(i) requesting the first user to enter sorting options for the search.

39. The computer-readable medium of claim 34 wherein instruction (b)(i) further includes the instruction of: including as the sorting options sorting the matching files by popularity, by date, by size, by price, and by the reseller commission.

40. The computer-readable medium of claim 39 further including the instruction of:
implementing at least six pricing models for file downloads within the digital marketplace, including a pay-per-download a model, a subscription model, a broadcast model, a private download model, a donation, and an infomercial model.

* * * * *